US008140580B2

(12) United States Patent
Rehm et al.

(10) Patent No.: US 8,140,580 B2
(45) Date of Patent: Mar. 20, 2012

(54) AGGREGATING PERSISTED OPERATIONAL DATA IN A DISTRIBUTED ENVIRONMENT

(75) Inventors: Werner Rehm, Heidelberg (DE); Masoud Aghadavoodi Jolfaei, Wiesloch (DE); Carl P. Staszkiewicz, Speyer (DE)

(73) Assignee: SAP AG, Walldorf (DE)

(*) Notice: Subject to any disclaimer, the term of this patent is extended or adjusted under 35 U.S.C. 154(b) by 552 days.

(21) Appl. No.: 12/334,099

(22) Filed: Dec. 12, 2008

(65) Prior Publication Data
US 2010/0153454 A1 Jun. 17, 2010

(51) Int. Cl.
*G06F 17/00* (2006.01)
(52) U.S. Cl. ......................... 707/791; 709/203
(58) Field of Classification Search .................. 707/791; 709/221, 226
See application file for complete search history.

(56) References Cited

U.S. PATENT DOCUMENTS 5,920,863 A * 7/1999 McKeehan et al. ............ 718/101
2008/0120129 A1 * 5/2008 Seubert et al. .................... 705/1
* cited by examiner

*Primary Examiner* — Belix M Ortiz
(74) *Attorney, Agent, or Firm* — Blakely, Sokoloff, Taylor & Zafman LLP

(57) ABSTRACT

Coordinating persisted data in a distributed system, in which persisted data is stored with identifiers that indicate a hierarchical relationship of the persisted data with a business scenario. When operation data is stored as a record of a transaction within the distributed system, a root identifier (ID) and a connection ID can be added to the operational data record. The root ID indicates a source endpoint of the transaction, and the connection ID indicates a communication message from the source endpoint to the destination endpoint related to the transaction. A persisted data coordination engine can access persisted data in the distributed system and generate a business scenario transaction tree based on the root ID and the connection ID. A map of the business scenario transaction tree can then be created and reported.

26 Claims, 6 Drawing Sheets

AGGREGATING PERSISTED OPERATIONAL DATA IN A DISTRIBUTED ENVIRONMENT

FIELD

Embodiments of the invention are generally related to error analysis, and more particularly to organizing and aggregating tracing data and other persisted data in a distributed environment.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2008, SAP AG, All Rights Reserved.

BACKGROUND

To analyze errors within a software system, traces are commonly used. Traces are typically understood to be records of information about execution of the software system for purposes of debugging the software system. Tracing can be useful in analyzing error situations of work processes (e.g., through kernel or user traces) to identify the reason of malfunctioning.

While tracing can be a useful mechanism, it has significant limitations within distributed systems. To really localize an error, usually traces from an entire business scenario would need to be analyzed. A business scenario refers to multiple related enterprise services that are related in one or more processes. In a distributed business scenario, parts of an application, and one or more parts of the business scenario processes may be executed concurrently on different application servers. One or more parts of the business scenario processes may be based on different communication protocols (e.g., RFC (remote function call), HTTP (hypertext transfer protocol)). Based on the distributed nature of many enterprise platforms, current trace infrastructures are not known that can provide enough information to localize and merge the associated trace files, especially across protocols. Thus, tracking or coordinating trace data within a distributed system is costly in time and effort.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
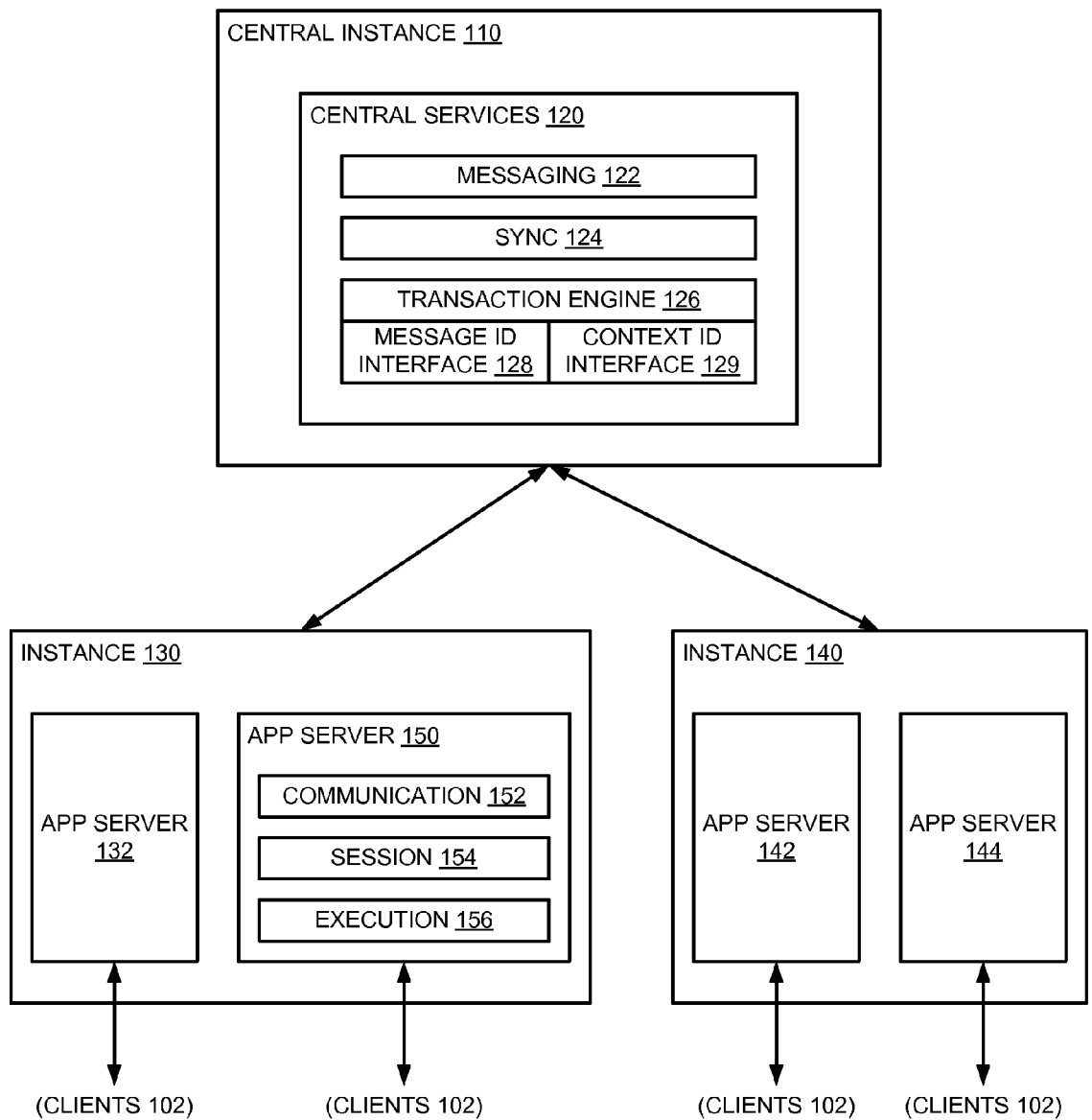
FIG. 1 is a block diagram of an embodiment of a distributed system that coordinates persisted data.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, persisted operational data, such as traces, is coordinated in a distributed system. Persisted operational data or traces are augmented to include identifiers that indicate relationships between items of persisted data or traces throughout the distributed system. Thus, an entire view of a business scenario can be mapped. Such relationship identifiers may include a root identifier (ID) that indicates a source endpoint of the transaction, and a connection ID that indicates a communication message from the source endpoint to the destination endpoint related to the transaction. In one embodiment, a system already has a context ID that indicates whether a communication or a root exist at a client or a server side of a transaction, and such information is leveraged in conjunction with the root ID and the connection ID to obtain a full picture of the business scenario. In implementations where such information is not already present, such a context ID can be added to the persisted data. Additionally, in one embodiment, certain connections are stateful, maintaining state in a connection or communication channel across multiple requests. Where stateful connections exist, a sequence ID may also be included with the persisted data to indicate what request the data is associated with. Each item of persisted data can be gathered and mapped in relationship to other items of data. Thus, an entire picture of the business scenario is obtainable within a distributed system.

As mentioned above, traces are generally understood to be stored information regarding the execution of an application, and are generally understood to be specifically related to debugging. As described herein, traces may be considered one specific example of persisted operational data within a distributed system. The persisted operational data refers to information that is stored or persisted about any service or interface within the distributed system. Persisted operational data is not understood to be limited solely to debugging. To the extent persisted operation data and traces can be understood as different, traces can be considered a subset of persisted operational data, or simply, persisted data. The identifiers and relationships between data and based on identifiers as described herein is applicable whether to traces or other persisted data within the distributed system. Herein various descriptions are made with reference to "persisted data," while other descriptions more specifically refer to "traces." In such descriptions where traces are referred to, it will be understood that the principles of identifiers for the traces is equally applicable to other persisted data that may not be considered a trace.

FIG. 1 is a block diagram of an embodiment of a distributed system that coordinates persisted data. System 100 is a distributed system, which includes various servers executed on system hardware. Specifically shown are central instance 110, and instances 130 and 140. The combination of a central instance and its associated instances may be referred to as a cluster, and there may be multiple clusters within system 100. Central instance 110 includes services available to the various distributed instances (such as 130 and 140) throughout system 100. Each instance may include one or more application (app) servers, which interface with zero or more clients 102. As suggested above, work processes within system 100 can be originated at either client or server, and there may be client and server relationships between clients 102 and the application servers, and between components of the application servers and other components of system 100.

Central instance 110 is illustrated including central services 120. It will be understood that central instance 110 may include more functional components than central services 120, and that additional services not illustrated in FIG. 1 are possible. For purposes of simplicity, only certain elements are shown, which should not be understood as limiting.

Among components that may be included in central services 120 are messaging services 122 and synchronization (sync) services 124. Messaging services 122 enable communication between instances, and the passing of information within system 100. Synchronization services 124 represents any type of service, such as locking or timing services, that coordinate the operation of instances 130 and 140. Such synchronization may be more specifically understood with reference to access to services, interfaces, objects, databases, etc.

In one embodiment, central services 120 include transaction engine 126, which may be a tracing engine that has message ID interfaces 128 and context ID interfaces 129. Message ID interfaces 128 are understood as interfaces that enable central instance 110 to gather persisted data based on identifiers that indicate root and connection relationships, as described herein. Context ID interfaces 129 represent interfaces that enable central instance 110 to gather information that indicates a client-server relationship of a transaction or connection. Combining all information enables transaction engine 126 to map connection relationships for transactions within distributed system 100, and may also enable transaction engine 126 to determine a client-server relationship of particular transaction information. The client-server relationship may indicate, for example, whether a particular process was initiated by a client or server, and what service and protocol interactions took place between the client and server.

In one embodiment, the operation of transaction engine 126 is protocol independent. That is, connection IDs can be stored with persisted information, and subsequently gathered and used regardless of the protocol employed for a particular connection. Two specific protocol example described in more detail below are RFC (remote function call) and HTTP (hypertext transfer protocol). Briefly, RFC is understood as a procedure for exchanging data between a client and server. Typically the client calls a server, which then returns results. RFCs are commonly used, for example, with enterprise systems available from SAP AG, of Walldorf, Germany, and in particular, with ABAP (Advanced Business Application Programming) to provide an interface for an external program to exchange data with an enterprise server. HTTP is understood as a request/response protocol between clients and servers that operates on top of a transport protocol (TCP (transport control protocol) and UDP (user datagram protocol) being common examples) to enable the exchange of data between the client and server. ID information can be added in the case of either HTTP or RFC exchanges, as described in more detail below.

Instance 130 is shown having two application servers, 132 and 150, with details shown for application server 150. Instance 140 is also illustrated with two application server, 142 and 144. It will be appreciated that each instance may include any number of application servers, and two in each instance are shown for purposes of illustration only. Additionally, while certain details of application server 150 are illustrated, it is not to be understood as an exhaustive explanation of an application server, which is assumed to be understood by those skilled in the art. Each application server may include various server nodes (not shown). In one embodiment, each application server 132, 150, 142, 144, include server nodes for an ABAP platform, a Java 2 Platform, Enterprise Edition (J2EE), or other platform.

Certain details of a single application server, 150, are shown for simplicity in the drawings the description, but it will be appreciated that each of the other servers could likewise or alternatively be illustrated in a more detailed manner. Specifically illustrated within application server 150 are communication 152, session 154, and execution 156. Communication 152 represents engines and interfaces (including business logic) that enable application server 150 to communication with clients and with other components of system 100. Session 154 represents logic that enables application serve 150 to initiate and/or participate in a communication session with a component of system 100, such as a requesting client 102. Execution 156 represents the execution of business logic including the calling or execution of services and processes that will result in storing persisted information within system 100.

In one embodiment, communication 152 represents a communication layer that adds a connection ID to each message exchange. Similarly, session 154 may represent logic that generates a session ID or sequence ID for stateful sessions. In one embodiment, execution 156 represents logic that enables application server 150 to add or pass along a root ID for communication exchanges with application server 150. In a particular implementation, the communication layer generates the connection ID and connection counter/sequence ID—the statefulness of a connection is implicitly in place. Thus, a communication layer (e.g., RFC layer, HTTP/ICF layer), transmits the connection ID and connection counter with each request, when the connection handle/object is used by an application for the communication. Whereas the connection ID is created once for a new connection the sequence ID/connection counter is increased with each request, before it is transferred to the partner.

While described above with specific reference to the example of system 100, it will be understood that the techniques described herein for coordinating persisted data within a distributed system are not limited to a particular network configuration or architecture, other than being a distributed system of having application servers that apply IDs to persisted information. In general, a persisted data labeling or a tracing infrastructure is independent of type of transport protocol. In one specific embodiment, a system employs both RFC and HTTP, and the persisted data infrastructure based on the transport behavior of specified persisted data identifiers, regardless of the type of protocol that resulted in the persisted information being stored. In one embodiment, persisted data identifiers are transmitted with each request for the protocols used within a system.

Such an identifier-based infrastructure enables the identifiers to be evaluated not only by sender and receiver processes, but also by gateway or supported processes (e.g., by a gateway for an RFC protocol implementation, and/or by an ICMan or Webdispatcher process for HTTP). The infrastructure can be considered to have both bottom-up and top-down implications. The bottom-up implications include that persisted data can be found, gathered, and related within the distributed system based on the identifiers of the persisted data. Thus, a reconstruction of the communication steps (transitive closure) and the involved processes can be provided. The top-down implications include that mechanisms are put in place for each initiated process to include the identifiers. Thus, by executing a business scenario with activated work process trace or operational data storage, a mechanism can be provided for assembling the involved persisted data sections.

Note that three potential solutions are possible with an identifier-based infrastructure. Each has advantages and drawbacks. In one embodiment, two identifiers are used, one to represent the root ID, or the root context ID, and another for connection IDs. Both the root ID and each connection ID are unique identifiers within the distributed system. Unique identifiers can be, for example, globally unique IDs (GUIDs) or universally unique IDs (UUIDs), or equivalents. Each layer in the execution process can generate and assign or obtain and assign the IDs. Through the use of a root ID and a connection ID, the identification and assembly of persisted data file sections can be derived. The root ID allows the whole involved persisted data files to be identified, while the connection IDs help to identify both communication partners, as well as merge those persisted data sections into an application (control) flow.

In another embodiment, a root ID and a connection ID are used, but the root ID is a unique identifier, while the connection ID is a sequence number, which the server session inherits. Each server session in turn extends the sequence number with an additional sequence number for subsequent requests. Again, based on the root ID, the system can identify the whole involved persisted data file, while the sequence number enables the identification of each execution step and the assembly of flow logic at each level.

In another embodiment, a root ID, a connection ID, and a separate sequence ID are used. Both the root ID and the connection ID can be unique identifiers, which an additional sequence number, or connection sequence number, specifies the number of requests initiated on the same connection and connection ID, respectively. In such an embodiment, the sequence number may not be forwarded to the subsequent server sessions in the chain, but rather, only to the communication partner.

Advantages to a solution using unique identifiers for the root ID and connection ID include a limited memory consumption that does not require a dynamic memory management at any involved layer. Such an implementation can use a certain number of characters for the unique IDs (e.g., 32 or 40 characters for the root context, and 32 characters (or 16 bytes)), which does not require a dynamic memory management at any involved layer. Advantages to a solution using a unique root ID and a sequence ID include the ability to determine the total number of requests at each level (in each session). Furthermore, with the second solution, the system can follow the execution flow at the request level. Advantages to a solution using unique IDs for the root ID and the connection ID, and using a sequence ID include the ability to determine the total number of requests per connection, and to be able to follow the execution flow at the request level. Additionally, because the sequence IDs are only shared between communication partners, the required memory is fixed.

Disadvantages to a solution using unique IDs for the root ID and connection ID include the lack of ability to identify an HTTP stateful connection (one on which multiple requests may be made on the same connection, and context is saved for all communication exchanges on the connection). Furthermore, the system cannot reconstruct the execution flow at the request level. Disadvantages to a solution using a unique root ID and a sequence ID include the variable memory requirement for the sequence number. In an implementation where the sequence number is passed along, the memory requirement depends on the communication depth, which is not fixed. Such a circumstance is not tolerable in many cases, such as when the information should be persisted on the database. Furthermore, it requires expensive memory management at each intermediary process (gateway, ICMan (Internet Connection Manager), RFC, and ICF layer). Disadvantages to a solution using unique IDs for the root ID and the connection ID, and using a sequence ID include the lack of ability to determine the sequence number within a connection ID at the individual levels of the business scenario.

As mentioned above, the unique identifier can be a UUID or GUID. For purposes of simplicity, the following descriptions refer to a GUID as an example of a unique identifier. Thus, in one embodiment, each connection ID is a GUID that represents a connection between client and server. In one embodiment, the connection sequence number is a counter that represents the number of requests initiated by the associated connection. The parent ID is the root ID GUID that represents the business application context and the (root) initiator of the communications.

The work process persisted data or traces from a business scenario can provide a picture of the executed kernel functions that belong to different components of the system (e.g., taskhandler, ABAP, Dynpro, ICF (Internet Communication Framework), etc.). The kinds or types of operations that result in persisted information that can be considered include database access, filesystem operations, looks, functional operational data, statistical data, runtime data, process traces, etc.

With distributed processes, an application, and also a human user, cannot know where within the distributed system processes or operations are being executed. Traditionally the lack of knowing how a business scenario is executed across the distributed system creates a problem with propagating information through the communication channels to get data to analyze, which may be considered a trace type problem. However, the identifiers allow the information to be propagated through the distributed system in a way to indicate relationships among persisted data. With the identifiers in place for persisted information, a central server or central instance of the distributed system can activate persisted data for an entire whole business scenario. When the whole business scenario is activated to generate persisted data with identifiers or labels indicating the root and connection associated with the transaction, all engines track the process. With all persisted information identified, the central server can gather and bring together the data for the whole business scenario to graph. The graph indicates what process initiated what process.

In one embodiment, the central server includes a persisted data search engine to find persisted data within the distributed system. When persisted information is found, the system can then find a header to the persisted data file. With selected interfaces, the central server can search trees of persisted data to find all persisted information, and find all information belonging to common root processes. The system can then build up the graph or connection tree based on what process initiated another, based on the communications, or the transactions.

Considering the ability to gather persisted information related to communication transactions with processes or operations within a distributed scenario, there may still be information needed to provide a complete picture of the communication network. Such information may be referred to as a context ID, which can indicate a relationship between the source and destination endpoints of a connection. For example, a client-server relationship between connection partners can be provided. Based solely on root ID and connection idea, it may not be apparent to which context a transaction belongs (e.g., client-side or server side). Thus, in one embodiment, an additional identifier indicating the relationship can be provided. The identifier can be a standard code, an identifier of one of the endpoints (e.g., the endpoint identified may always be the server or the client), or a number to indicate server-side or client side. In one embodiment, the information exists within another layer of the distributed system. For example, a statistic layer in SAP systems is considered a lower layer than, for example, an ABAP engine, and includes a context ID. Thus, in one embodiment, a transport of the lower layers has the context ID, and it does not need to be included in a passport of the higher layer.

Consider as a general example a patch or support package in a system that supports traces. Traditionally, testing required evaluating the entire business scenario, seeing that it was not possible to determine what specific sections needed to be tested based on the patch. Now, however, the entire use case can be traced, and through a resulting graph of traces gathered, the system can indicate how the patch will affect the system. Based on seeing what will be affected, a user is able to test only necessary portions of the business scenario that are affected by the patch. Such an approach significantly reduces testing time. A user can determine what layers of the system are affected by a particular patch or software change.

Consider also as a general example a system that generates traces having GUIDs as unique identifiers for the root and connection IDs. The GUIDs are created as soon as the session is created, and the trace gets the ID from the engine that created the session. The connection layer framework (e.g., RFC, HTTP) generates a new GUID. While many examples are given with respect to RFC and HTTP, it will be understood that the principles discussed herein can easily be adapted to alternative protocols, such as SMTP (Simple Message Transfer Protocol) or intersession eventing/messaging. In one embodiment, a counter increases each time a new request is made on the connection in the session. The connection layer inserts into the passport (the record including the IDs) these pieces of information. In one embodiment, the connection ID and the counter are stored before the payload, in a header. Thus, header information with the payload is a passport, or a container. Then the receiver or the destination endpoint of the distributed system adapts and puts its own information in the container.

When the transaction engine or tracing engine, or the component of the central server that gathers persisted data, requests all the persisted information in the system, as mentioned above. In one embodiment, the gathering of information is performed in a "dummy" approach. In the dummy approach, the transaction engine puts the gathered information into the root system and requests the root and the connections, and iterates through all systems. In an alternate embodiment, a more advanced approach is used, where the transaction engine knows what systems are associated with what data (e.g., via a data map or lookup table), and the transaction engine can directly request the information from the appropriate destination systems. Thus, the IDs provide an infrastructure that enables the generation of a graph, or to set up and distribute the IDs, and to filter persisted information based on ID. Thus, the persisted information can be provided to the applications in the distributed system.

It will be understood that all involved layers should obey the same rules for storing persisted data, such as traces, for the construction of the whole trace picture of an application flow. The specified persisted data identifiers are recovered in each of the sections of processes, such as workprocess, gateway, ICMan, Webdispatcher, and also in the involved communication components such as the taskhandler, RFC, and ICF. For a reconstruction of the executed paths in a business scenario with help of the work process traces, the involved communication partners and their components have to transport and expose the same information, e.g. a correlation id, along the communication steps.

Figure 2:
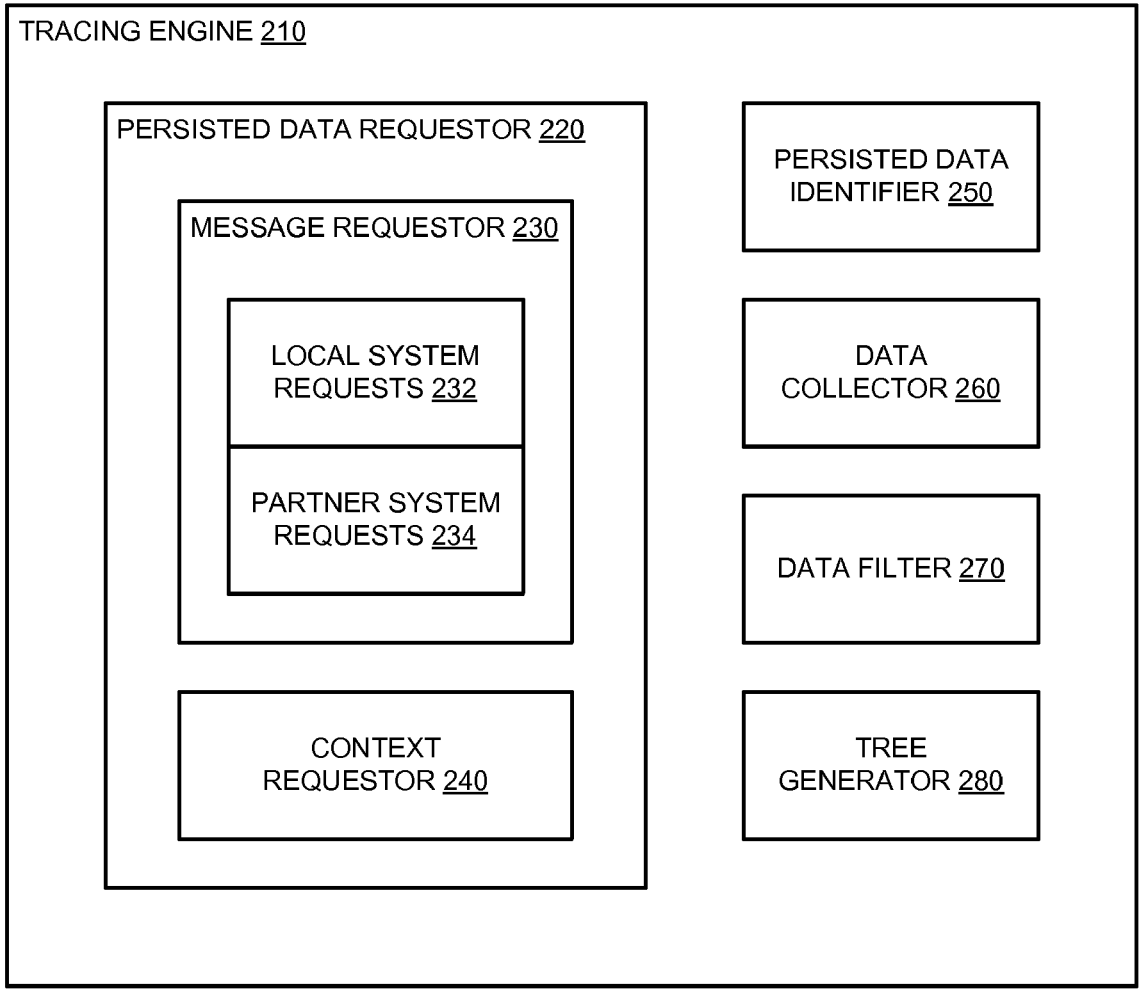
FIG. 2 is a block diagram of an embodiment of a tracing engine for a distributed system that coordinates persisted data.

FIG. 2 is a block diagram of an embodiment of a tracing engine for a distributed system that coordinates persisted data. Tracing engine 210 represents a transaction engine or tracing engine in accordance with any embodiment described herein. In a distributed system having an identifier-based persisted data infrastructure, tracing engine 210 gathers and propagates information about persisted data through the distributed system. One or more applications (e.g., testing applications, diagnostics, analysis engines, etc.) within the distributed system may request information about relationships for transactions, processes, or other operations in the distributed system. The applications are not capable of obtaining such information in traditional systems. With the identifier-based infrastructure, a central server having tracing engine 210 can gather and propagate or otherwise distribute the persisted data information.

Tracing engine 210 may include various functional blocks, examples of which are illustrated in FIG. 2. Specifically, persisted data requestor 220 includes components that enable tracing engine 210 to obtain persisted data and other information necessary to construct a connection view of the distributed system. Persisted data requestor 220 includes message requester 230 and context requester 240. Message requestor 230 includes interfaces to enable tracing engine 210 to access persisted data from local systems and from partner systems. The interfaces may include business logic to make requests on the local system for persisted data, which may include database request mechanisms. Reference to a local system refers to a central server and group of application servers that receive services from the central server or central instance. Partner systems include instances, application servers, or central servers of other systems separate from the central server of which tracing engine 210 is a part. Local system requests 232 refer to requests made within the system itself, which partner system requests 234 represent the requests made to external systems that have a common identifier-based infrastructure.

Context requestor 240 includes interfaces to a location where a context ID is stored, in an embodiment where a context ID is used. As mentioned previously, a context ID can be obtained from another layer, or can be placed as an ID within the persisted data (e.g., in a container for the persisted data).

In one embodiment, tracing engine 210 identifies a particular trace, or particular persisted data with persisted data identifier 250. Persisted data identifier 250 includes a search feature to find specific information about a specific process, and where it fits within a tree of persisted data within the distributed system. Persisted data identifier 250 may track particular GUIDs or may include a mapping table to indicate that certain systems contain data of certain types.

Data collector 260, data filter 270, and tree generator 280 function together to generate a tree or a map to indicate the relationships and logical layout of the business scenario through its communication components. Data collector 260 represents interfaces to obtain the identified data, including persisted data identified as related to other persisted data, based on identifiers. Data filter 270 enables tracing engine 210 to selectively group persisted data based on root identifier or some other identifier. Thus, data from separate systems can even be grouped together as related based on common communication paths as indicated by identifiers stored in the data. Tree generator 280 enables tracing engine 210 to generate a tree indicating relationships between and among data elements. Building such trees is understood in the art, and can be performed, for example, by generating a linked list, or creating a structured, ordered list.

With the data graph of information from message requestor 230 as gathered and combined by data collector 260, data filter 270, and tree generator 280, there may still be a piece missing from the graph. That piece of information missing from the graph is provided by context requester 240, and is a relationship context, and specifically whether a transaction is server side or client side. The relationship context information could also be added to the trace header, but if the information is already available at another layer, such as in an SAP system, the information at the other layer can be leveraged. Thus, in one embodiment, the context can be referred to by a context ID, which is part of a statistics layer. As an example, an engine could exist above the level of the identifier-based infrastructure that could call the trace or persisted data information from that infrastructure, and then add the context information from the other infrastructure (the statistics).

Figure 3:
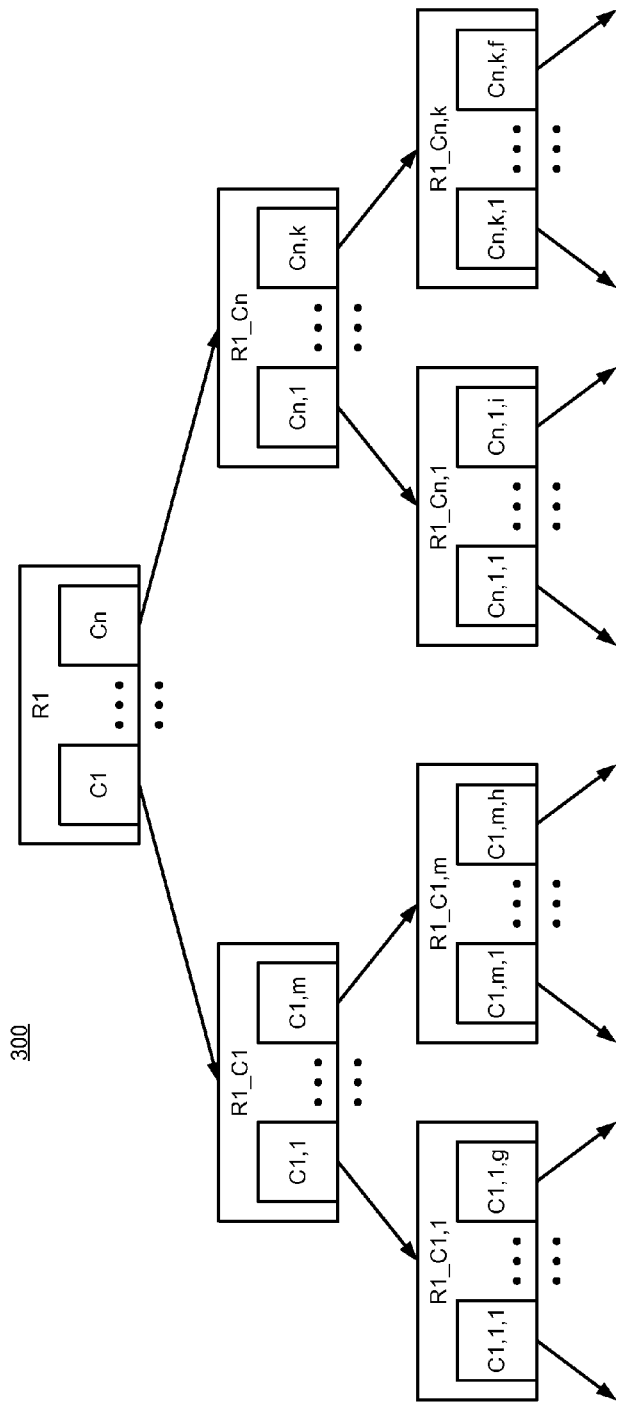
FIG. 3 is a block diagram of an embodiment of a communication tree derived from persisted data within a distributed system.

FIG. 3 is a block diagram of an embodiment of a communication tree derived from persisted data within a distributed system. Tree 300 illustrates a distributed business scenario. For purposes of simplicity in description, traces will be used as examples. It will be appreciated that what is described with reference to traces can apply equally well to other persisted data.

Each communication partner within the distributed business scenario should deliver trace information not only about the caller process but also about the root of the business process and possible execution steps. Tree 300 illustrates an abstract representation of communication processes (sessions) in the form of a parent-child relation tree. At the root or the "top" of the tree, transaction R1 has communication channels C1 through Cn. Each channel is a child of R1, and has its own context. Processes executed as children of R1 are represented as R1_C1 through R1_Cn. The children of R1_C1 are R1_C1,1 through R1_C1,m, and so forth through R1_Cn,1 through R1_Cn,k. Each letter n, m, k, and the others shown in FIG. 3 are arbitrary variables that can be any number.

The tree continues on through different variables for each parent channel. All communications within the channel are identified by the identifier of the block (e.g., R1, or R1_C1,1, or R1_Cn,k,f, etc.). Information having common identifiers is related to the same transaction. It will be understood that there is no requirement that any branch of tree 300 have any particular number of sub-branches. There is also no requirement that every branch have the same number of levels of children.

Figure 4:
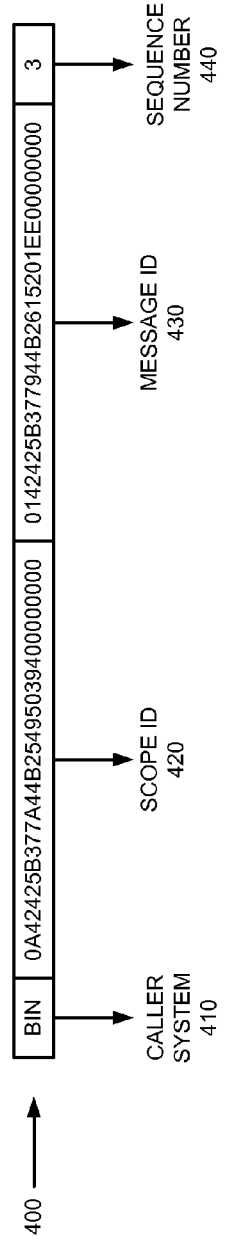
FIG. 4 is a block diagram of an embodiment of piggybacking identifiers on persisted information tracking communication.

FIG. 4 is a block diagram of an embodiment of piggybacking identifiers on persisted information tracking communication. Header 400 represents a header that may be used to create a container for a payload of persisted data (not shown). As an example of what a header may include to create a persisted data container, header 400 includes a field to indicate caller system 410, a field to indicate scope ID 420, a field to indicate message ID 430, and a field to indicate sequence number 440. The values shown in each of the fields is not particularly important, except to show the types of information that may be included in each field.

Consider for purposes of example that header 400 is a header for an HTTP transaction. Scope ID 420 is a GUID representing the HTTP client. Scope ID 420 identifies the original initiator (root) of the HTTP communication. Scope ID 420 is transferred to the HTTP partners to enable the detection of all involved communication sides. Message ID 430 is a GUID representing an HTTP message. Each HTTP request is represented with a message id which is transmitted to the receiver acting as a correlation ID for both communication endpoints. Sequence number 440 is a number representing the request sequences. With each request the scope sequence number is sent to the partners for later evaluation of communication steps.

Figure 5A:
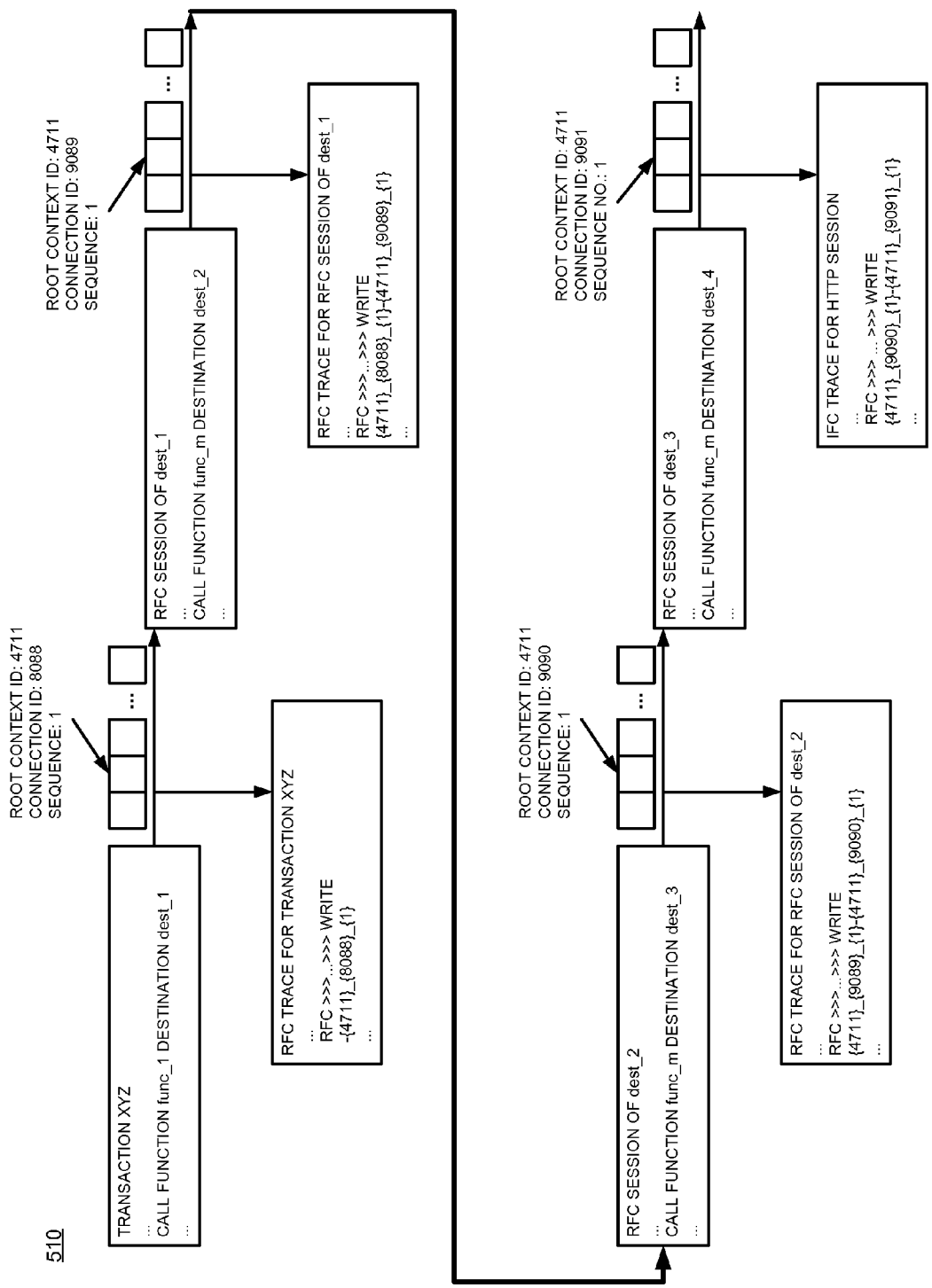
FIG. 5A is a block diagram representation of an embodiment of transport of trace identifiers along an RFC communication.

FIG. 5A is a block diagram representation of an embodiment of transport of trace identifiers along an RFC communication. Flow 510 shows the flow of trace identifiers (GUIDs for root context IDs and connection IDs, and a number for a connection sequence number) along an RFC communication. It will be understood that with a remote function call (RFC), a system calls functions directly in a system (e.g., using an ABAP interface or RFC API). Flow 510 follows transaction XYZ, which calls a function at destination at dest_1. The message is indicated by the root context ID 4711, connection ID 8088, and the sequence number 1. An RFC trace for transaction XYZ includes the identifier -{4711}_{8088}_{1}. The following RFC session of dest_1 has a corresponding trace for its request. The RFC trace includes the identifier {4711}_{8088}_{1}-{4711}_{9089}_{1}, corresponding to the root context ID (4711), the connection ID (9089), and the sequence number (1 sequence on the session).

The transaction continues with an RFC session of destination dest_2. Its root context is (4711), and its connection ID corresponds to the new communication session. The trace corresponding to the communication has the identifier {4711}_{9089}_{1}-{4711}_{9090}_{1} to identify the communication's logical location with a communication tree. Lastly, FIG. 5A shows an RFC session for dest_3, which calls a function at dest_4. A trace corresponding to the communication with the associated root ID, connection ID, and connection sequence is also created.

Figure 5B:
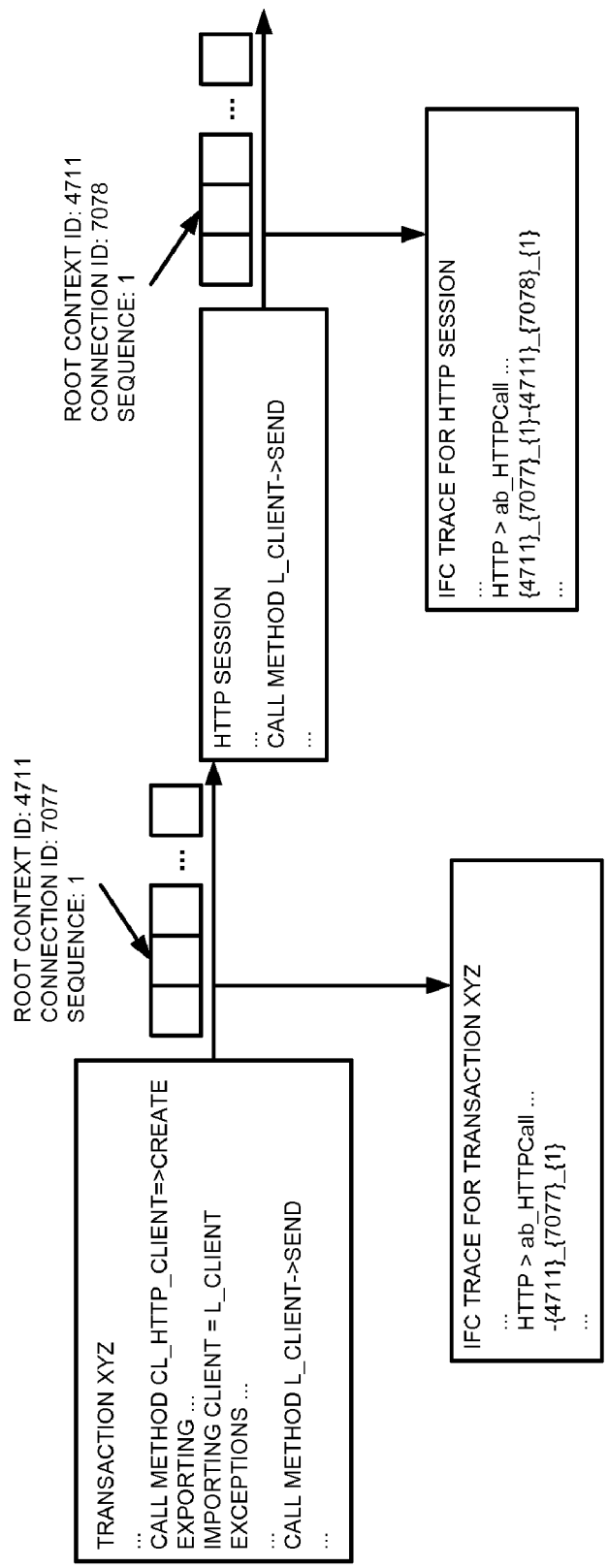
FIG. 5B is a block diagram representation of an embodiment of transport of trace identifiers along an HTTP communication.

FIG. 5B is a block diagram representation of an embodiment of transport of trace identifiers along an HTTP communication. Flow 520 shows the flow of trace identifiers (GUIDs for root context IDs and connection IDs, and a number for a connection sequence number) along an HTTP communication. Another transaction XYZ is shown, which is not necessarily the same transaction XYZ shown in FIG. 5A, but it may be. An ICF trace is created for the transaction communication, which includes the root context ID 4711, connection ID 7077, and the sequence number 1. It will be appreciated that an ICF (Internet Communication Framework) recorder transmits with each HTTP request (as a client, and responds as a server) the identifiers for building up a transitive closure of the involved execution steps of a business scenario in a system. Thus, an RFC trace for transaction XYZ includes the identifier -{4711}_{7077}_{1}. It will further be appreciated that ICF enables a system to use HTTP, HTTPS, or SMTP to communicate from an enterprise system with other systems.

Flow 520 continues with an HTTP session, which has an associated trace. The trace associated with the HTTP session similarly includes the identifier {4711}_{7077}_{1}-{4711}_{7078}_{1}, corresponding to the identifier of its parent process, and to the identifiers associated with the request/method call of the HTTP session.

It will be understood that the trace extracts for ICMan and the gateway processes acting as a server are not explicitly shown. These files would contain the same trace information regarding the root context ID, connection ID, and sequence number, as described above. Therefore, the root context ID, connection ID, and sequence number are also transmitted by the ICMan and the gateway process to the next station (communication partner).

In one embodiment, the root context ID is administrated by the taskhandler, while the connection IDs for RFC and HTTP requests initiated by an ABAP report are generated by the RFC and HTTP layer, respectively. In the case of external RFC and HTTP requests, the generation of a root context ID and connection ID can be the responsibility of ICMan and the gateway processes.

In one embodiment, the root context ID has a lifecycle. The lifecycle of the root context ID may be bound to the external session and may be valid for all included internal modes, e.g., internal mode 0 . . . n. Thus, as soon as a new ABAP transaction or report is loaded into the main internal mode (i-mode 0 without easy access transaction and i-mode 1 with easy access transaction), the root context ID is renewed. In an alternate embodiment, the root context ID should be bound to an SAP transaction, if the initiator resides in an SAPGUI. In this way, during execution of an ABAP transaction and in an external mode, further internal modes are created via ABAP statements. Thus, the root context may be kept stable and the same. In such an embodiment, a root context ID should only be renewed when the internal mode 0 is replaced/eliminated by a new transaction context, e.g., via a transaction command (e.g., an OK field of SAPGUI).

In one embodiment, the connection IDs and sequence numbers have lifecycles. The lifecycles of the connection IDs and their associated connection sequence numbers may be bound to the lifecycle of the RFC connection in the case of RFC communication, and HTTP client object in the case of HTTP communication. Thus, with each new RFC connection or HTTP object a new connection ID is created.

Figure 6:
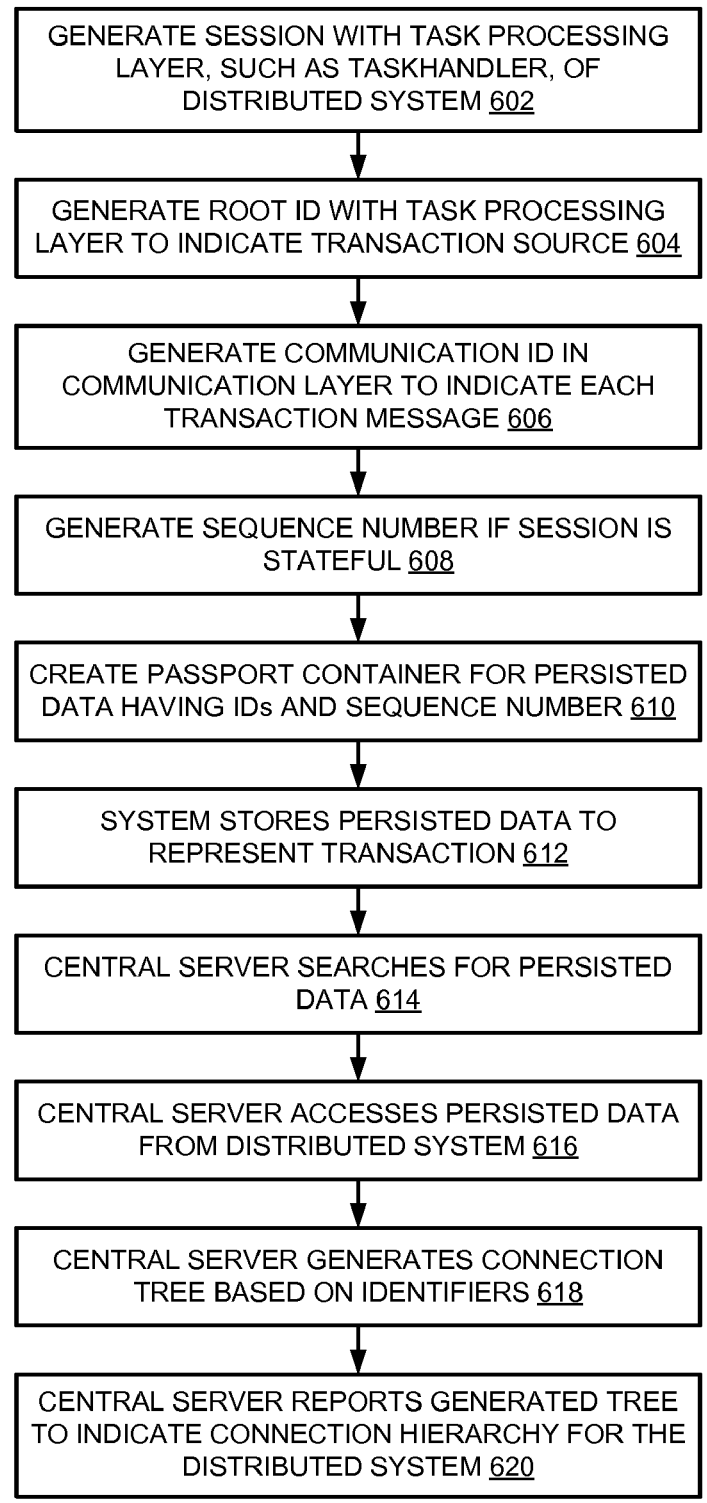
FIG. 6 represents a flow diagram of an embodiment of coordinating persisted data in a distributed system.

FIG. 6 represents a flow diagram of an embodiment of coordinating persisted data in a distributed system. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

Flow 600 describes a potential flow of operations for creating and gathering persisted data based on an identifier-based infrastructure as described herein. When an application or a processing unit of a distributed system performs operations related to a distributed process, a task processing unit or task processing layer that performs the operations may generate a session of a transaction, 602. Such a processing layer may include a taskhandler. Assuming persisted information is generated for the transaction, in one embodiment, the task processing layer generates a root ID or root context ID to indicate a source of the transaction, 604. A communication layer generates a connection ID to indicate each message generated for the transaction, 606. The communication layer also generates a sequence number for any stateful sessions created, 608. The processing unit creates a passport container for the persisted data, including the generated identifiers, 610, which are transmitted with each request to a communication partner. The persisted data is stored at the system that created the session for the transaction, to represent a record of the transaction, 612.

In one embodiment, a central instance of the distributed system is to access the persisted data to report on the persisted data. For example, one or more applications may generate requests in the distributed system for persisted data information, which request can be handled by providing persisted data. Thus, the central server may propagate persisted data information through the distributed system. In one embodiment, the central server searches for persisted data within the distributed system, 614. Such a search may begin locally, and then continue with partner systems that are external. Such a search may be performed with a "search-everywhere" approach where the central server does not have any indication where data might be persisted, and searches each system. Such a search may alternatively be performed based on knowledge of where certain types of persisted data are stored, and certain systems may be specifically accessed.

When persisted data is found or known, the central server may access the persisted data, 616. The central server then generates a connection tree for the distributed system based on the persisted data, and the identifiers stored with the persisted data, 618. Based on the identifiers, the central server is able to filter and organize data to indicate hierarchy or relationships within the connection tree. The central server can then report the generated connection tree or parts of it, or information based on processing or searching the tree, to any application or human user that needs or requests the information. Thus, the central server reports the tree to indicate a connection hierarchy for the distributed system, 620.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method in a distributed system comprising:
    generating in a server of the distributed system an operational data record corresponding to a transaction in the distributed system, the transaction to be exchanged between communication endpoints via communication messages related to the transaction, the operational data record to be persisted as a record of the transaction;
    at a source endpoint that initiates the transaction, adding a root identifier (ID) to the operational data record that indicates the source endpoint that initiated the transaction, the root ID being a unique ID within the distributed system, uniquely identifying in the distributed system the transaction from the source endpoint;
    at each destination endpoint that receives a communication message related to the transaction, adding a connection ID to the operational data record that indicates the communication message to the destination endpoint, the connection ID being a unique ID within the distributed system, uniquely identifying in the distributed system the communication message to the destination endpoint; and
    storing the operational data record with the root ID and each connection ID as persisted data in the server that services the transaction, the persisted data to identify the transaction through the operational data record, and indicate a hierarchical position of the transaction and each communication message of the transaction within a business scenario transaction tree through the root ID and the connection IDs.

2. The method of claim 1, wherein the first and second unique IDs are globally unique identifiers (GUIDs) or universally unique identifiers (UUIDs).

3. The method of claim 1, wherein the root ID and the connection ID are transmitted by one communication partner to another in a request.

4. The method of claim 1, wherein storing the operational data record as persisted data comprises:
    storing the operational data record as a trace.

5. The method of claim 1, wherein the persisted data has an associated protocol of either a remote function call (RFC) or a hypertext transfer protocol (HTTP).

6. The method of claim 1, further comprising:
    adding a sequence number to the operational data record to indicate the request number within a sequence of requests for a single session that corresponds with the operation data record.

7. The method of claim 1, further comprising:
    combining the operational data record with a context ID that indicates client and server relationship for the transaction.

8. A computer readable storage medium having instructions stored thereon to cause a processor to perform operations including:
    generating in a server of the distributed system an operational data record corresponding to a transaction in the distributed system, the transaction to be exchanged between communication endpoints via communication messages related to the transaction, the operational data record to be persisted as a record of the transaction;
    at a source endpoint that initiates the transaction, adding a root identifier (ID) to the operational data record that indicates the source endpoint that initiated the transaction, the root being a globally unique identifier (GUID) within the distributed system, uniquely identifying in the distributed system the transaction from the source endpoint;
    at each destination endpoint that receives a communication message related to the transaction, adding a connection ID to the operational data record that indicates the communication message to the destination endpoint, the connection ID being a GUID within the distributed system, uniquely identifying in the distributed system the communication message to the destination endpoint; and
    storing the operational data record with the root ID and each connection ID as persisted data in the server that services the transaction, the persisted data to identify the transaction through the operational data record, and indicate a hierarchical position of the transaction and each communication message of the transaction within a business scenario transaction tree through the root ID and the connection IDs.

9. The computer readable medium of claim 8, wherein the root ID and the connection ID are transmitted by one communication partner to another in a request.

10. The computer readable medium of claim 8, wherein the instructions for storing the operational data record as persisted data comprise instructions for
    storing the operational data record as a trace.

11. The computer readable medium of claim 8, wherein the persisted data has an associated protocol of either a remote function call (RFC) or a hypertext transfer protocol (HTTP).

12. The computer readable medium of claim 8, further comprising instructions for
    adding a sequence number to the operational data record to indicate the request number within a sequence of requests for a single session that corresponds with the operation data record.

13. The computer readable medium of claim 8, further comprising instructions for
    combining the operational data record with a context ID that indicates client and server relationship for the transaction.

14. A method in a distributed system of servers comprising:
    accessing persisted data by a central server of the distributed system from one or more servers in the distributed system, each element of persisted data including
        an operational data record corresponding to a transaction in the distributed system, the transaction to be exchanged between communication endpoints via communication messages related to the transaction,
        a root global unique identifier (GUID) that indicates a source endpoint that initiated the transaction, the root GUID being a unique ID within the distributed system, uniquely identifying in the distributed system the transaction from the source endpoint, and a connection GUID that indicates a communication message to the destination endpoint, the connection GUID being a unique ID within the distributed system, uniquely identifying in the distributed system the communication message to the destination endpoint;

generating a hierarchical business scenario transaction tree of the persisted data for a business scenario including indicating a hierarchical position of the transaction and each communication message of the transaction within the business scenario transaction tree based on the root GUID and the connection GUID; and reporting the hierarchical business scenario transaction tree to indicate a location within the distributed system of each element of persisted data related to the business scenario.

15. The method of claim 14, wherein generating the hierarchical business scenario transaction tree further comprising:

generating the hierarchical business scenario transaction tree based on a sequence number that to indicates a request number within a sequence of requests for a single session that corresponds with the persisted data.

16. The method of claim 14, wherein generating the hierarchical business scenario transaction tree further comprising:

searching for persisted data by root GUID and connection GUID.

17. The method of claim 16, wherein searching for the persisted data by root GUID and connection GUID further comprises:

searching first in a local system of the distributed system for persisted data; and searching subsequently in external systems of the distributed system for persisted data.

18. The method of claim 16, wherein searching for the persisted data by root GUID and connection GUID further comprises the central server having information about what systems have particular types of persisted data:

determining what systems have a particular type of persisted data to be searched for; and searching only in those systems having the particular type of persisted data.

19. The method of claim 14, further comprising:

accessing a context ID that indicates client and server relationship for the transaction.

20. The method of claim 19, wherein accessing the context ID further comprises:

accessing a statistics layer of the distributed system to obtain the context ID for the transaction.

21. A distributed system comprising:

a source endpoint to initiate a transaction;

at least one destination endpoint to participate in the transaction with the source endpoint, the transaction to be exchanged between communication endpoints via communication messages related to the transaction; and a server to generate an operational data record corresponding to the transaction, the operational data record to be persisted as a record of the transaction, the server to add a root identifier (ID) to the operational data record that indicates the source endpoint that initiated the transaction, the root ID being a unique ID within the distributed system, uniquely identifying in the distributed system the transaction from the source endpoint;

add a connection ID to the operational data record for each destination endpoint that receives a communication message related to the transaction that indicates the communication message to the destination endpoint, the connection ID being a unique ID within the distributed system, uniquely identifying in the distributed system the communication message to the destination endpoint; and store the operational data record with the root ID and each connection ID in a storage device as persisted data to identify the transaction through the operational data record, and indicate a hierarchical position of the transaction and each communication message of the transaction within a business scenario transaction tree through the root ID and the connection IDs.

22. The distributed system of claim 21, wherein the root ID and the connection ID are transmitted by one endpoint to another in each request exchange.

23. The distributed system of claim 21, further comprising the server to add a sequence number to the operational data record to indicate the request number within a sequence of requests for a single session that corresponds with the operation data record.

24. A distributed system comprising:

a data storage device to store persisted data including an operational data record corresponding to a transaction in the distributed system, the transaction to be exchanged between communication endpoints via communication messages related to the transaction, a root global unique identifier (GUID) that indicates a source endpoint that initiated the transaction, the root GUID being a unique ID within the distributed system, uniquely identifying in the distributed system the transaction from the source endpoint, and a connection GUID that indicates a communication message to the destination endpoint, the connection GUID being a unique ID within the distributed system, uniquely identifying in the distributed system the communication message to the destination endpoint; and a central server to access the persisted data from the data storage, and combine the accessed persisted data with other elements of persisted data accessed from the distributed system to generate a hierarchical business scenario transaction tree of the persisted data of the distributed system for a business scenario including indicating a hierarchical position of the transaction and each communication message of the transaction within the business scenario transaction tree based on the root GUID and the connection GUID, and report the hierarchical business scenario transaction tree to indicate a location within the distributed system of each element of persisted data related to the business scenario.

25. The distributed system of claim 24, wherein the central server is to further generate the hierarchical business scenario transaction tree based on a sequence number that to indicates a request number within a sequence of requests for a single session that corresponds with the persisted data.

26. The distributed system of claim 24, wherein the central server is to access the persisted data, identify the root GUID and connection GUID of the transaction, and search for additional data having the same root GUID within the distributed system.

* * * * *